Figure 1:
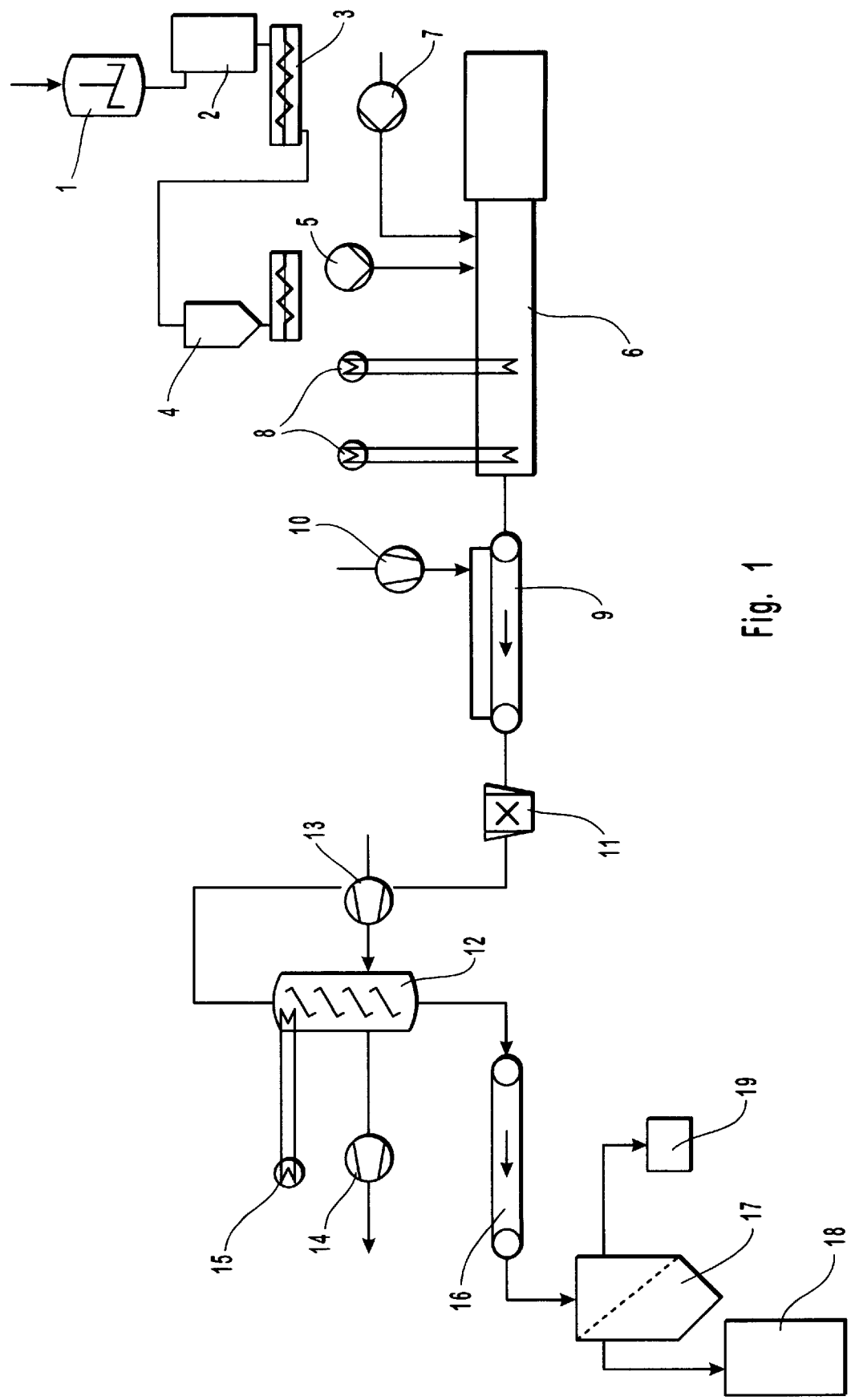

United States Patent [19]
Lörcks et al.

[11] Patent Number: 6,136,097
[45] Date of Patent: *Oct. 24, 2000

[54] PROCESS FOR PRODUCING THERMOPLASTIC STARCH

[75] Inventors: Jürgen Lörcks, Rees; Winfried Pommeranz, Enger; Kurt Klenke, Kleve; Harald Schmidt, Emmerich; Joachim Heuer, Kranenburg, all of Germany

[73] Assignee: Biotec Biologische Naturverpackungen GmbH & Co., Forschungs- und Entwichlungs KG, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/553,453

[22] PCT Filed: May 27, 1994

[86] PCT No.: PCT/EP94/01741

§ 371 Date: Feb. 5, 1996

§ 102(e) Date: Feb. 5, 1996

[87] PCT Pub. No.: WO92/28029

PCT Pub. Date: Dec. 8, 1994

[30] Foreign Application Priority Data

May 27, 1993 [DE] Germany .............................. 43 17 696

[51] Int. Cl.[7] ........................... C08B 30/12; C08B 30/00; C68L 35/00; A01J 1/10
[52] U.S. Cl. ................................. 127/32; 127/67; 127/71; 106/206.1; 106/215.5; 426/516; 536/102
[58] Field of Search .................................. 127/32, 67, 71; 106/206.1, 215.5; 426/516; 536/102

[56] References Cited

U.S. PATENT DOCUMENTS

| | | | |
|---|---|---|---|
| 3,265,509 | 8/1966 | Wurzburg et al. | 99/134 |
| 4,076,846 | 2/1978 | Nakatsuka et al. | 426/62 |

FOREIGN PATENT DOCUMENTS

| | | | |
|---|---|---|---|
| 654605 | 4/1965 | Belgium . | |
| 30304401 | 2/1989 | European Pat. Off. | C08L 3/02 |
| 14117628 | 12/1992 | Germany | C08L 3/04 |
| 5 679564 | 3/1992 | Switzerland | B29C 43/02 |
| 2208652 | 4/1989 | United Kingdom | C08B 30/06 |
| 19014938 | 12/1990 | WIPO | B29C 47/76 |
| WO 92/19680 | 5/1992 | WIPO | C08L 3/02 |
| 19404600 | 3/1994 | WIPO | C08J 5/18 |

OTHER PUBLICATIONS

Patent Abstracts of Japan—English Abstract of Japanese Patent Publication No. 4–210222, Jul. 1992.

*Primary Examiner*—Mark L. Bell
*Assistant Examiner*—Patricia L. Hailey
*Attorney, Agent, or Firm*—Workman, Nydegger & Seeley

[57] ABSTRACT

A process is disclosed for producing thermoplastic starch based on renewable raw materials and, if required, for further processing it into a granulate. A low viscosity starch is modified under a low shearing stress during the extrusion process and leaves the extruder with an increased viscosity in the form of a strip, threads or in other geometrical shapes. The advantages of the invention mainly lie in the improved quality of the starch products, the preservation of the mechanical parts of the extruder installation and the increase of the nominal output of the extruder.

21 Claims, 1 Drawing Sheet

PROCESS FOR PRODUCING THERMOPLASTIC STARCH

The invention relates to a process for producing biopolymeric, thermoplastic starch on the basis of renewable raw materials by extrusion in the form of a strip, threads or in other geometrical shapes. This extrudate can be further processed into a granulate.

In the prior art granulates from thermoplastic starches and other modified starches are obtained by extrusion in such a manner that directly at the outlet of the extruder the hot modified starch is cut to granular pieces by a rotating blade. During the extrusion step the starch is disintegrated under pressure and temperature. Normally the natural water content of 10 to 20% is sufficient and optionally solvents, additives and plasticizers can be added. The plastic hot starch mass is subject to mechanical and/or physico-chemical damage by the reaction conditions in the extruder and the high shearing stress, i.e. as undesired side-effect an unavoidable molecular decomposition of the starch polymer is accepted. As a result, the binding strength and film strength of the extruded starch deteriorate as the film strength of the starch is reduced in dependence of the molecular weight. The twin-screw extruder experiences an above-average wear due to the high viscosity and stickiness of the destructurized starch. Therefore, either very expensive, wear-resisting machine parts must be used for the extruder casing and the screw material or the respective components are subject to an over-proportional wear entailing both high costs and non-constant quality of the produced thermoplastic starch. Due to the wear and tear problems of the extruder and the quality problems of the starch thermoplastics this process, which is for instance disclosed in GB-A-2 208 652, has so far not been widely accepted.

It is the object of the present invention to provide an improved process for producing a starch extrudate, preferably in granulate or fibrous form, such that the quality of the product is improved, the mechanical wear of the extruder equipment is reduced while increasing its capacity.

This object is achieved with the features of the patent claims.

The present invention is based on the following concept:

Thermoplastic starch is disintegrated with low viscosity and low shearing strength and is chemico-physically modified in the extrusion process. The highly viscous liquid thermoplastic starches leave the extruder in the form of a strip, filaments or in other geometrical shapes and are then conditioned to compact, stabilize and carefully after-treat them. Subsequently, the solidified starch may be granulated or further processed into fibers and adjusted in a further conditioning step to the desired residual moisture and packaged.

The invention exhibits the following advantages: protection of the thermoplastic starch, no molecular decomposition, considerably improved quality, protection of the extruder equipment, no wear as the inner friction is considerably minimized, and in particular higher yields at lower torques and energy input. For example, the process according to the present invention yields thrice the amount of the nominal output of the twin-screw extruder than currently known processes.

The invention is illustrated by way of a working example.

The pertaining drawing shows in

FIG. 1 the inventive principle of the process for producing granulated thermoplastic starch.

As shown in FIG. 1, according to the process for producing thermoplastic starch the starting materials are mixed in a mixer 1. The mixture of raw materials from renewable raw materials such as polymeric carbohydrates from corn, wheat, potatoes, tapioca, hybrid corn or other cereal or starch containing roots or tubers is used and additional suitable emulsifiers such as glycerin monostearate are added to the mixture. After mixing the homogenous mass is added to a buffer container 2 which always carries a sufficient amount of mixture for a continuous process. From said container a feed screw 3 transports the mixture to a dosage device 4 which provides a twin-screw extruder 6 with a predetermined amount of mixture via a first inlet 5. Simultaneously with the addition of the mixture further additives are fed to the twin-screw extruder 6 via a second inlet 7, in particular plastifying, solubilizing, hydrophobizing, dyeing, film-forming, film-formation enhancing and/or fibrous adjuvants. In addition, inter alia glycerin to enhance plastification and/or textile fibers to form a supporting texture can be used. Altogether, these further additives serve to further reduce the melt's viscosity and thus contribute to maintaining the molecular structure of the starch polymer by resulting in a lower shearing stress on the starch during extrusion. Also, the mechanical stress of the machine parts of the extruder is considerably reduced and premature signs of wear in the extruder casing or the extruder screw can be prevented. The percentage of renewable raw materials in the mixture is generally 5 to 95% preferably is 50 to 90% particularly 60 to 85%, but it can have a higher or lower percentage depending on the requirements on the properties of the starch product to be produced. During the reaction the mixture of raw materials is destructurized in the twin-screw extruder 6 under pressure and temperature (e.g. heating by heating devices 8) and chemico-physically modified. Appropriate temperature control devices serve to adjust the temperature profile as regards time and place in the extruder 6 to optimize the treatment, e.g. according to the adjustments in German patent application P 42 28 016.0. Immediately before leaving the twin-screw extruder 6 the viscosity of the melt is increased by removing humidity while at the same time its temperature is reduced and the starch is discharged in the form of a strip, threads or in other geometrical shapes under a pressure of e.g. 25 to 150 bar and at a temperature of e.g. 30 to 220° C., preferably 30 to 99° C., and optionally spun into continuous filaments.

On a treatment line 9 subsequent to the twin-screw extruder 6, e.g. in form of a revolving conveyor belt, the extrudate may be chemico-physically aftertreated by way of an airation device 10, in particular it may be conditioned to solidify and stabilize the texture.

When a granulate is to be produced, the solidified starch is crushed in a mill and granulated and put into a dryer 12 to remove liquid, volatile plasticizers and adjuvants. The drying step comprises the continuous revolution of the granules in the dryer 12, ventilation of the dryer 12, e.g. via fans 13 and exhauster devices 14 as well as by way of a heating device 15. Finally, the granules are fed to a sieve 17 via a conveyer 16 to be sorted, then they are weighed and packaged in a filling station 18. For a control of the amount of granules fed to the sieve 17 the latter is provided with an overflow container 19.

The following example is intended to illustrate the composition of the mixture and the process conditions:

In an intimate mixer 1 a mixture of 100 kg corn starch and 1 kg glycerin monostearate is produced. This mixture is continuously fed to a twin-screw extruder 6 "Continua 37" of the company Werner & Pfleiderer AG, Germany, having a screw diameter of approx. 40 mm at a flow rate of 45 kg/hr. At the same time glycerin is added at a flow rate of 15 kg/hr.

By cooling the last two sections the outlet temperature at the die is adjusted to 90° C. At a screw rate of 210 rpm a mass pressure of 62 bar occurs. The released filaments are aftertreated on a conveyor belt 9 and fed to a mill 11. The crushed material is continuously dried in a paddle dryer 12 to a moisture of 2%.

We claim:

1. A process for producing thermoplastic starch in granulated or fibrous form, on the basis of renewable starch-containing raw materials and optionally with solid and/or liquid additives, comprising the following process steps:
   a) mixing the renewable starch-containing raw materials, optionally with solid and/or liquid additives, to give a homogenous raw material mixture in a first section;
   b) adding a dosed amount of the raw material mixture to a second section;
   c) adding to the raw material mixture a dosed amount of further additives to said second section;
   d) heating and reacting the raw material mixture and forming a melt with a first viscosity in a third section;
   e) cooling and plastifying the melt in a fourth and fifth section and extruding an extrudate of the thermoplastic starch with a second viscosity which is higher than the first viscosity, at a pressure of 25 to 150 bar and at a temperature of 30° to 99° C.,
   f) conditioning the extrudate in a sixth section; and
   g) emitting the extrudate in a seventh section.

2. The process according to claim 1, wherein the emitted extrudate is dried in an eighth section.

3. The process according to claim 1 characterized in that the renewable raw materials in the raw material mixture are polymeric carbohydrates obtained from the group consisting of corn, wheat, potatoes, tapioca, hybrid corn and other cereal or starch-containing roots or tubers.

4. The process according to claim 1 characterized in that as an additive glycerin monostearate is added as an emulsifier.

5. The process according to claim 4, wherein the glycerin monostearate is added as an emulsifier in the first section.

6. The process according to claim 1 characterized by adding as further additives an additive selected from the group consisting of plastifying, softening, solubilizing, hydrophobizing, dyeing, film-forming, film-formation enhancing and fibrous adjuvants.

7. The process according to claim 6, characterized by adding glycerin as plastifying adjuvant.

8. The process according to claim 6, characterized by adding textile fibers as fibrous adjuvant.

9. The process according to claim 6 wherein volatile softeners and adjuvants are removed from the extrudate in a drying step thereby adjusting a defined content of solid material.

10. The process according to claim 9 wherein the drying step occurs in an eighth section.

11. The process according to claim 6 wherein the further additives are added in the second section.

12. The process according to claim 1 characterized in that the raw material mixture contains 5 to 95% of renewable starch-containing raw materials.

13. The process according to claim 12 wherein the raw material mixture contains 50 to 90% of renewable starch-containing raw materials.

14. The process according to claim 12 wherein the raw material mixture contains 60 to 85% of renewable starch-containing raw materials.

15. The process according to claim 1 wherein in the first section the renewable starch-containing raw materials and the additives are mixed in a mixer to give a homogeneous raw material mixture.

16. The process according to claim 1 wherein in the second to fifth section the raw material mixture is heated, destructurized, chemico-physically modified and cooled off on a twin-screw extruder in relation to a pressure/temperature profile.

17. The process according to claim 1 wherein the starch is extruded in the form of a strip, threads or in other geometrical shapes.

18. The process according to claim 1 wherein the extrudate is subjected to an aftertreatment in the sixth section by conditioning it with gaseous, liquid, or solid adjuvants under elevated or reduced atmospheric pressure.

19. The process according to claim 1 wherein the conditioned extrudate is disintegrated into granulated thermoplastic starch in a crushing step after the conditioning step.

20. The process according to claim 1 wherein the emitting of the conditioned extrudate occurs as a continuous filament.

21. An extrudate in the form of a granulates or fibers of starch produced according to the process according to claim 1.

* * * * *